Figure 1:
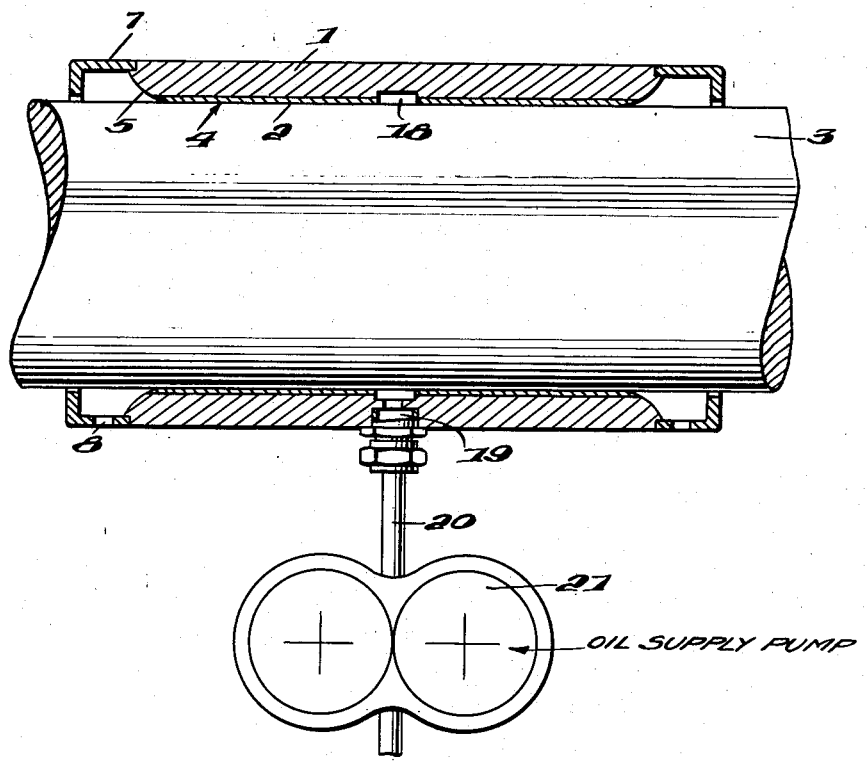

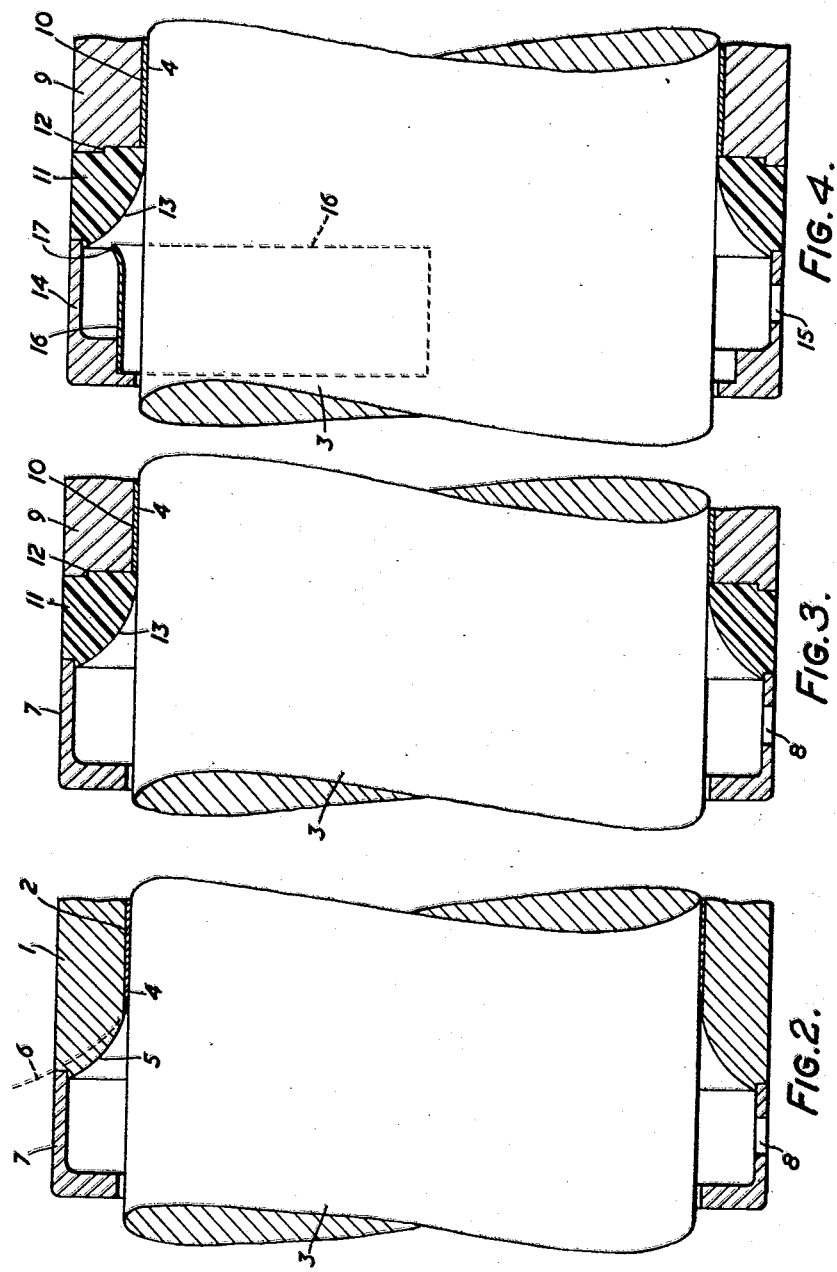

United States Patent Office 3,008,776
Patented Nov. 14, 1961

3,008,776
BEARING ASSEMBLIES
Phil Prince Love and Michael John Neale, Alperton, Wembley, England, assignors to The Glacier Metal Company Limited, Middlesex, England, a company of Great Britain
Filed Mar. 16, 1959, Ser. No. 799,665
Claims priority, application Great Britain Mar. 19, 1958
6 Claims. (Cl. 308—121)

This invention relates to bearing assemblies comprising co-operating bearing members having relative rotation (which for convenience herein will be assumed to comprise a fixed bearing member and a rotary bearing member), with means for supplying lubricating oil continuously to the bearing surfaces between the fixed and rotary bearing members.

When such a continuously lubricated bearing is operating, oil is discharged from an edge or two or more edges of the clearance space between the bearing surfaces, the rate of discharge usualy increasing with load and speed and also to some extent with the pressure at which oil is supplied to the bearing surfaces.

In conventional bearings of the kind referred to the surface of the stationary member where oil is thus discharged ends comparatively abruptly and the oil thus tends to fly off into the air space beyond such surface. With high rates of oil discharged in this way, considerable foaming of the oil collected in the sump or the like can be produced and this foaming can interfere with the satisfactory operation of the lubricating system. Moreover in some cases, such as steam turbines where a common oil source is used for the bearings and the control governor, such foaming can also interfere with the response of the governor. In addition the entrainment of air into the oil may constitute a fire risk.

An object of the present invention is to provide a form of bearing assembly of the kind referred to which will tend to reduce or eliminate these disadvantages.

To this end in a bearing assembly of the kind referred to according to the present invention oil control means are provided comprising a stationary control member having a surface (herein called a control surface) situated at and so formed that oil leaving the end or ends of the clearance space between the bearing members will tend to flow smoothly along the control surface instead of being projected into the surrounding air.

It is known to use journal bearings with radiused edges on the fixed member in conjunction with a corresponding radius on the rotating bearing member leading into a radial surface or flange of increased diameter. In such bearings however the ends of the cylindrical bearing surfaces are effectively "closed," and no equivalent problem arises. The present invention is by contrast applicable to open ended bearing assemblies where the oil is free to leave the end or ends of the clearance space in a direction in line with the bearing surfaces. Thus in the case of journal bearings the oil would be free to leave in an axial direction, whereas in the case of thrust bearings the oil would be free to leave in a radial direction.

Preferably the control surface is rigid with and forms in effect a continuation of the bearing surface of the fixed bearing member but in some cases it might conceivably be slightly spaced from the appropriate edge of such bearing member while being disposed so that oil leaving the clearance space between the bearing members will come into contact with it at such a small angle that the oil will not rebound from but will flow smoothly along the control surface.

Thus in one convenient arrangement the control surface will be integral with the bearing itself and that portion thereof adjacent to the bearing surface will be of the same metal as the bearing surface of the bearing and in this case, if the bearing surface proper should wear due for example to some failure of the oil supply, the adjacent part of the control surface would also wear. Alternatively the control member may be a separate component, preferably made of a material which can easily be worn away by the journal without causing damage, for example some such material as nylon, so that the part of the control surface adjacent to the bearing will so wear away, if and when the bearing surface wears away, without damage to the journal.

The appropriate shape of the control surface can be worked out for any particular bearing from the direction in which oil would escape from the edge of the bearing surface into free air, this direction being the result of the main oil velocity in the direction of motion of the moving surface of the bearing assembly and the oil flow rate from the bearing at right angles to such direction of motion, and one arrangement according to the invention and two modifications thereof are shown somewhat diagrammatically as applied to a plain cylindrical bearing with a journal in the form of a rotating shaft, in the accompanying drawings in which FIG. 1 is an axial section of a bearing in accordance with the invention associated with conventional means for supplying oil to the bearing, FIG. 2 is an axial section on an enlarged scale compared to FIG. 1 of one end only of the bearing shown in FIG. 1, FIG. 3 is an axial section on an enlarged scale as compared with FIG. 1 of one end only of a modification of the arrangement shown in FIGS. 1 and 2, and FIG. 4 is an axial section on an enlarged scale of an arrangement similar to that shown in FIG. 3 but including a shield.

In the construction shown in FIGURE 1 the cylindrical bearing comprises a fixed outer bearing member, which may be formed in known manner either as a single cylindrical member or in two or more circumferential parts, and comprises a shell 1, formed for example of steel and having applied and bonded to its cylindrical bore a lining 2 of bearing metal, such as white metal, within which rotates the shaft 3 to be supported by the bearing. The end of the outer bearing member constituted by the shell 1 and lining 2 is extended, as shown, beyond the end of the actual bearing surface indicated at 4 to provide an integral control member having a control surface 5 which follows a curve which, viewed in the cross-section shown, lies a little within and is of somewhat greater radius than that of the arc which, viewed in the same cross-section, would be followed in free air by oil leaving the adjacent end of the clearance space between the shaft 3 and the bearing surface 4. That arc might be, for example, of the form shown in dotted line at 6 in FIG. 2.

Secured to the end of the outer bearing member 1, that is to say at approximately the outer end of the control surface 5, is a collector ring 7 in which the oil from the control surface 5 will thus collect, this collector ring being provided for example with an oil discharge opening indicated at 8. As will be seen, the control surface 5 extends over the appropriate part of the end of the shell 1 and of the lining 2 so that, if and when the lining 2 wears, the adjacent part of the control surface will also wear. The liner 2 and the shell 1 are both cylindrical and the control surface 5 cuts diagonally across their ends. Thus the end of the liner 2 provides a small portion of the surface 5 while the end of the shell 1 provides the remainder. As shown in FIG. 1 the assembly includes a circumferential groove 18 extending through the lining 2 into the shell 1 to which oil is supplied through an opening 19 through the bearing connected by a pipe 20 to a conventional oil supply pump 21.

In the modification shown in FIGURE 3 the arrangement is generally similar to that shown in FIGURE 1 except that the outer bearing member comprises a cylindrical shell 9, for example of steel, with a bearing metal lining 10 and is formed at its end to receive an extension part 11, formed for example of nylon, and located relatively to the shell 9 by a spigot connection indicated at 12. The extension 11 thus constitutes a control member and is provided with a surface 13 constituting the control surface and following the same curve as the control surface 5 shown in FIGURE 1 (assuming that the direction of discharge of oil from the end of the surface of the bearing in free air in FIGURE 3 would correspond approximately to that indicated by the curve 6 in FIGURE 2).

In the construction shown in FIGURE 3 a collector ring 7 similar to the collector ring 7 in FIGURE 1 and having a discharge opening 8 is secured to the outer end of the extension 11. In this case, as will be seen, the control surface 13 extends substantially into engagement with the shaft 3 close to the end of the bearing surface 4.

In the construction shown in FIGURE 4 the arrangement is generally similar to that shown in FIGURE 3 and similar parts have therefore been designated by similar reference numerals and will not be again described. In the construction shown in FIGURE 4, however, instead of a collector ring 7 as in FIGURE 3, a collector ring 14 having an oil discharge opening 15 is provided, this collector ring carrying an approximately semi-cylindrical shield 16 surrounding the upper half of the shaft 3 and serving to prevent oil which may drip from the upper part of the collector ring 14 dripping on to the shaft 3 and thus being flung out again. As will be seen, the shield 16 has a shallow lip 17 to ensure that oil does not flow from the free end thereof.

It will be understood that in most cases the opposite end of the bearing assembly to that shown in each of the figures would be similarly constructed and arranged.

What we claim as our invention and desire to secure by Letters Patent is:

1. A bearing assembly comprising cooperating stationary and rotary substantially cylindrical bearing members, said bearing members having a clearance space therebetween communicating with a passageway displaced from at least one end of said stationary bearing member, means for supplying oil under pressure to said passageway, means for controlling the discharge of oil from said clearance space to said one end of said stationary bearing member, said means comprising a stationary member positioned adjacent to said one end of said stationary bearing member and having a control surface which extends from adjacent to the edge of the inner surface of said stationary bearing member axially and radially from said edge, all points of said surface in any plane normal to the axis of the bearing being nearer to said axis than all points in the same plane of the surface generated by the free path of oil discharged from said end of said space.

2. A bearing assembly as defined in claim 1 in which said control surface is a smooth convex curved surface.

3. A bearing assembly as defined in claim 1 in which said stationary member the surface of which provides said control surface is integral with said stationary bearing member.

4. A bearing assembly as defined in claim 1 in which said stationary member the surface of which provides said control surface consists of a non-metallic material attached to said stationary bearing member.

5. A bearing assembly as defined in claim 1 comprising a collector ring attached to said stationary bearing member and positioned to receive oil discharged from said control surface, said ring extending below and having a discharge opening below said rotary bearing member.

6. A bearing assembly as defined in claim 5 comprising a shield attached to said collector ring and positioned between the upper part of said collector ring and the upper surface of said rotary bearing member, said shield serving to prevent oil from dripping from said collector ring onto said rotary bearing member.

References Cited in the file of this patent

UNITED STATES PATENTS

| | | |
|---|---|---|
| 824,187 | Lowe | June 26, 1906 |
| 1,189,898 | Anderson | July 4, 1916 |
| 1,308,116 | Ross | July 1, 1919 |
| 1,324,035 | Cosgray | Dec. 9, 1919 |
| 2,831,737 | Jacoby | Apr. 22, 1958 |